(12) United States Patent
Reinsch et al.

(10) Patent No.: US 6,425,529 B1
(45) Date of Patent: Jul. 30, 2002

(54) CONTROLLED INJECTION OF DRY MATERIAL INTO A LIQUID SYSTEM

(76) Inventors: Frank G. Reinsch, 6239 N. Hickory Ct., Kansas City, MO (US) 64118; John A. Latting, 12401 Searcy Rd., Kearney, MO (US) 64060

(*) Notice: Subject to any disclaimer, the term of this patent is extended or adjusted under 35 U.S.C. 154(b) by 0 days.

(21) Appl. No.: 09/383,139

(22) Filed: Aug. 25, 1999

(51) Int. Cl.⁷ .................. B05B 17/00; B05B 17/26
(52) U.S. Cl. .................. 239/10; 239/67; 239/68; 239/69; 239/71; 239/74; 239/310; 239/302; 239/315; 239/662; 239/663; 366/163.2
(58) Field of Search .................. 239/10, 61, 67, 239/68, 69, 71, 74, 302, 310, 315, 663, 662; 222/57, 63, 133, 143, 181.1, 367, 608, 626, 630; 366/114, 151.1, 152.2, 163.1, 163.2

(56) References Cited

U.S. PATENT DOCUMENTS

| | | | |
|---|---|---|---|
| 1,833,275 A | * 11/1931 | Burmeister | 239/310 X |
| 2,026,731 A | 1/1936 | Farley | |
| 2,229,037 A | * 1/1941 | Boldman | 366/114 |
| 2,572,862 A | 10/1951 | Israel | |
| 2,578,116 A | 12/1951 | White et al. | |
| 2,580,581 A | 1/1952 | Niemitz | |
| 2,596,824 A | 5/1952 | Scott | |
| 2,615,693 A | * 10/1952 | Matirko | 222/57 |
| 2,648,428 A | 8/1953 | White et al. | |
| 2,660,560 A | * 11/1953 | Pickard | 366/163.1 X |
| 2,674,206 A | 4/1954 | Scott | |
| 2,750,073 A | * 6/1956 | Coffman, Jr. | 222/57 |
| 3,030,153 A | 4/1962 | Krenke et al. | |
| 3,240,533 A | * 3/1966 | Mommsen | 239/379 X |
| 3,414,163 A | * 12/1968 | Gaddis | 222/57 X |
| 3,542,250 A | 11/1970 | McRitchie | |
| 3,694,037 A | 9/1972 | Feder | |
| 3,697,052 A | * 10/1972 | Andris | 259/8 |
| 3,809,438 A | 5/1974 | Hubbard | |
| 4,571,143 A | 2/1986 | Hellerich | |
| 4,695,205 A | 9/1987 | Levine | |
| 4,793,743 A | 12/1988 | Grodecki et al. | |
| 4,834,586 A | 5/1989 | Depew | |
| 5,147,152 A | 9/1992 | Link | |
| 5,163,786 A | 11/1992 | Christianson | |
| 5,573,149 A | * 11/1996 | Saito | 222/367 X |
| 5,803,673 A | 9/1998 | Reinsch | |

FOREIGN PATENT DOCUMENTS

| | | |
|---|---|---|
| AT | 00215893 | 6/1961 |
| AU | 00546995 | 11/1985 |
| DE | 92015395 | 6/1993 |
| SU | 00583959 | 12/1977 |

OTHER PUBLICATIONS

"Seedvac Bulk Seed Conveyor," Pamphlet, 6 pg.s, (Sep. 1996).

* cited by examiner

Primary Examiner—Robin O. Evans
(74) Attorney, Agent, or Firm—Fish & Richardson P.C.

(57) ABSTRACT

A device and method for dispensing precise amounts of dry particulate matter, such as agricultural chemicals, directly into a liquid carrier stream, such as a flow of water, and a method of employing such a device to distribute chemicals. The device includes a bin for holding a quantity of particulate matter, a conduit for transporting a stream of liquid carrier, and a meter at the bottom of the bin for controllably releasing a desired amount of the particulate matter from the bin into the conduit while disallowing entry of the liquid carrier to the bin. The bin, conduit and meter are all mounted upon a portable structure for transportation with particulate matter in the bin. The meter includes a multi-vaned rotor turned by a controlled motor, and defines discrete pockets of known volume. The operator simply connects the device to a flow of water and keys into the controller an amount of material to be released. The rotor releases the material into a chamber under vacuum pressure generated by a venturi, through a check valve, and into an eductor. Agricultural chemicals may be advantageously distributed to end users in particulate form, to be mixed with a liquid carrier at the work site, without possibly harmful exposure to chemical dust and fumes.

52 Claims, 5 Drawing Sheets

Figure 1:
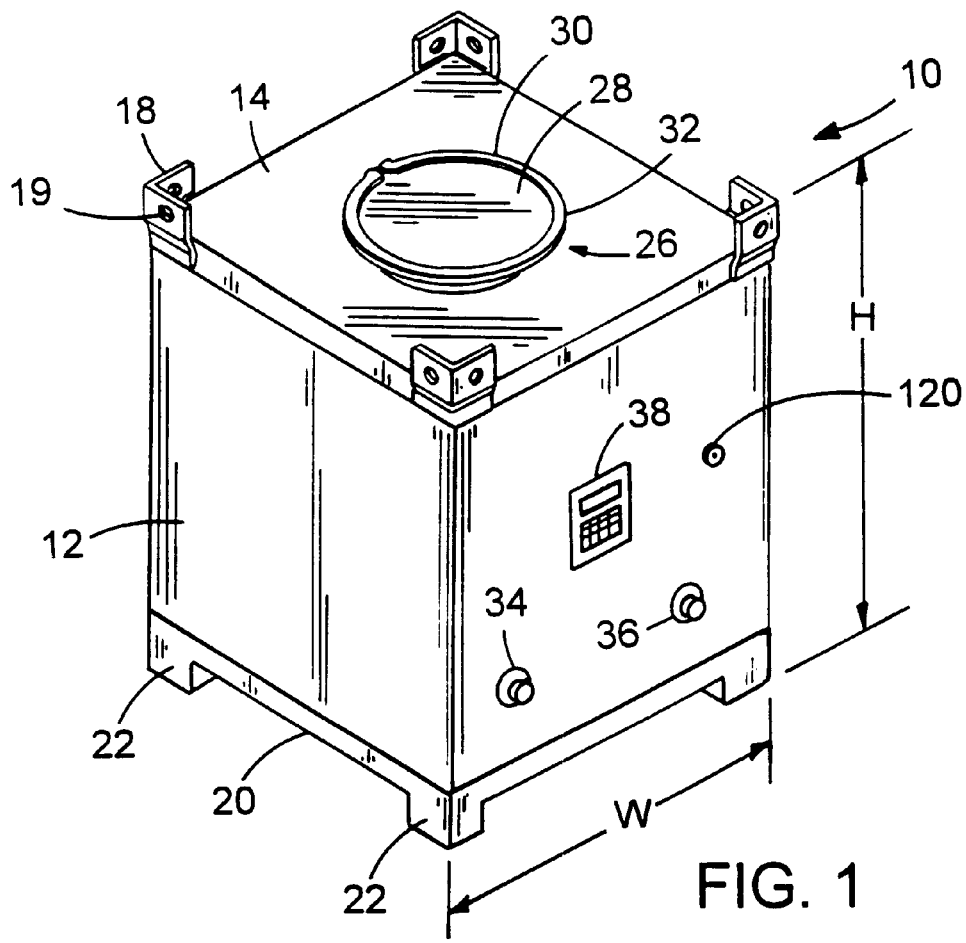
Figure 2:
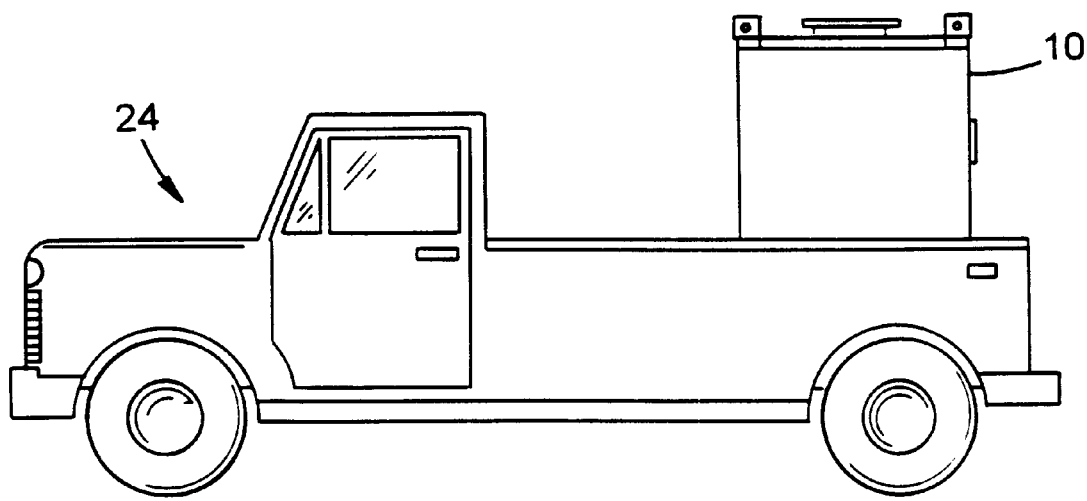

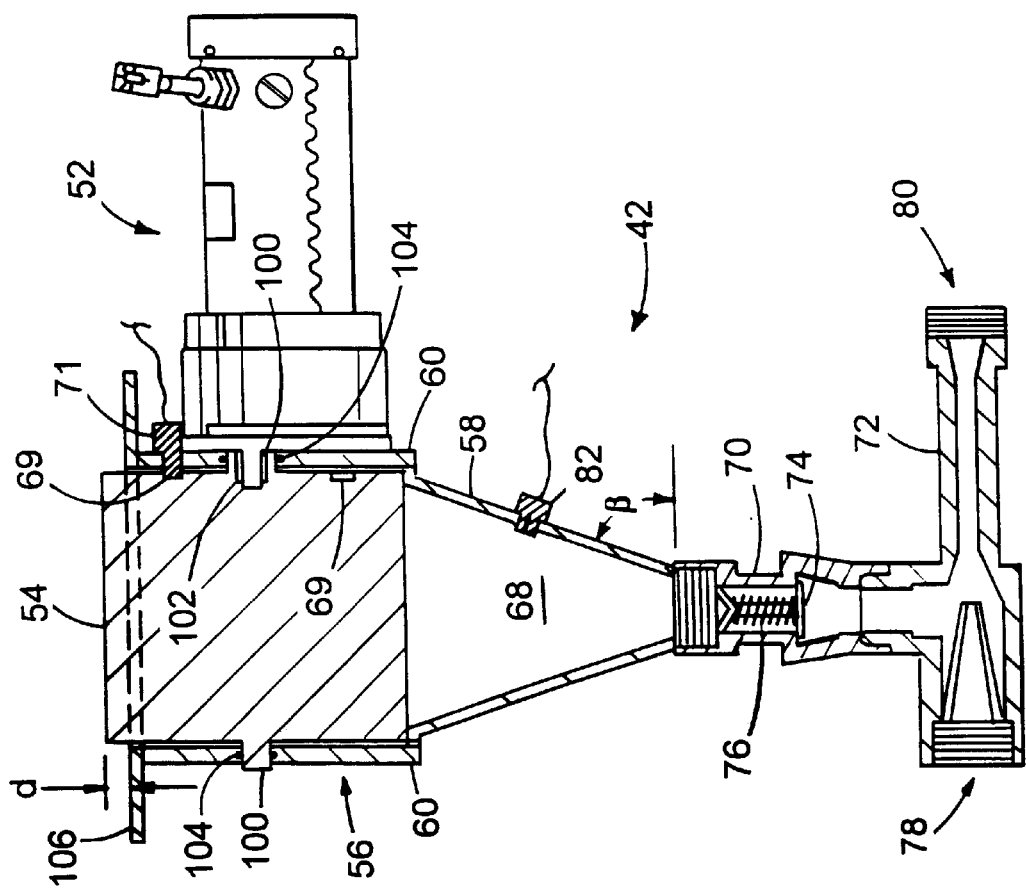
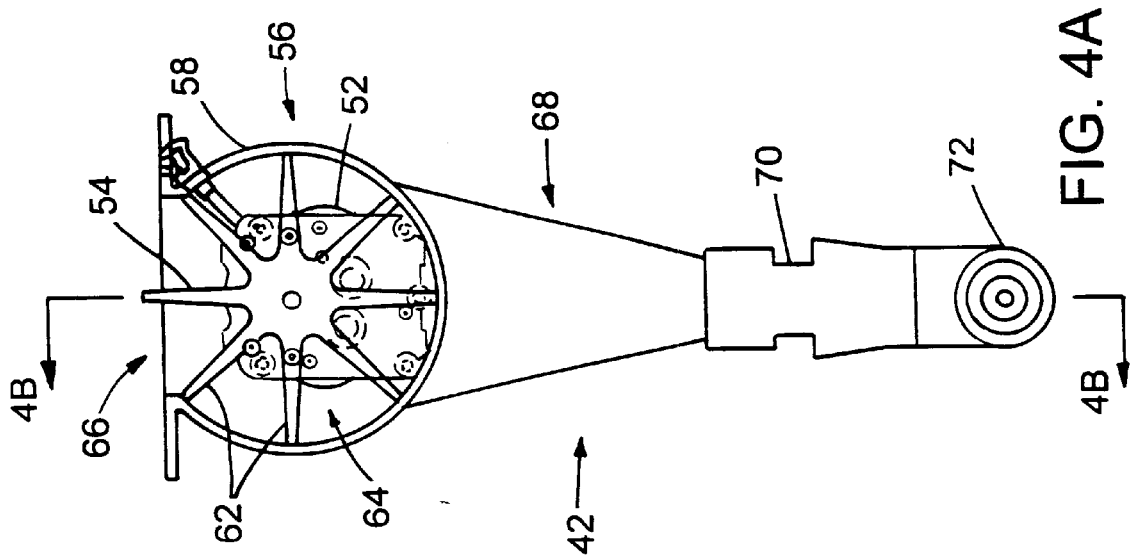
FIG. 4B
FIG. 4A

CONTROLLED INJECTION OF DRY MATERIAL INTO A LIQUID SYSTEM

BACKGROUND OF THE INVENTION

This invention relates to a device and method for shipping and dispensing precise amounts of dry particulate matter, such as fertilizer and pesticide products and such, into a liquid carrier stream.

Many useful agricultural chemicals and other such products are distributed in dry bulk form, either as powders, granules or small pellets, but are ultimately dissolved into a liquid carrier for application by spraying or irrigation equipment. Thus, a farmer will either purchase the chemicals dry, either in bags or bins, and mix them with water or other liquid carrier as needed, such as by pouring the dry chemicals and liquid carrier separately into a mixing tank, or will transport a tank to a chemical dealer who will dispense a pre-mixed solution into the tank. Unfortunately, environmental and safety regulations are typically more stringent regarding the transportation of chemicals in liquid form than in dry form.

Pneumatic systems have been developed for metering and transporting dry particulate matter in a stream of air, from a bulk storage bin to a mixing tank for subsequent mixing with a liquid. A useful example of such a system is a portable unit described in U.S. Pat. No. 5,803,673 and sold under the trade name "ACCUBIN". The entire contents of the above-referenced patent are incorporated herein by reference as if fully set forth.

With many agricultural chemicals, prolonged exposure to high concentrations of air-borne particulates is not desirable.

SUMMARY OF THE INVENTION

The invention features a means of transporting and storing a dry particulate material, and then dispensing controlled quantities of that material directly into a stream of liquid carrier. The invention is particularly applicable for use with agricultural chemicals, such as pesticides (e.g., herbicides), fertilizers and adjuvants. By "particulate form", we mean to include powders, granular and pelletized materials that are not suspended in a liquid medium.

According to one aspect of the invention, a device is provided for dispensing precise amounts of dry particulate matter directly into a liquid carrier stream. The device includes a bin for holding a quantity of particulate matter, a conduit for transporting a stream of liquid carrier, and a meter connected to the bin for controllably releasing a desired amount of the particulate matter from the bin into the conduit while disallowing entry of the liquid carrier to the bin. The bin, conduit and meter are all mounted upon a portable structure for transportation with particulate matter in the bin.

In the embodiment discussed in more detail below, the meter is arranged at the bottom end of the bin, such that the particulate matter is fed into the meter by gravitational force.

In some embodiments, the meter includes a multi-vaned rotor constrained to rotate within a housing, with the rotor vanes defining between them discrete pockets of known volume. These pockets preferably each have a volume of less than about 30 cubic inches (500 cubic centimeters), more preferably less than about 25 cubic inches (400 cubic centimeters), and most preferably less than about 10 cubic inches (150 cubic centimeters).

In some cases, the meter also includes an electric drive motor for driving the rotor.

In presently preferred embodiments, the device includes a controller for controlling the number of revolutions of the motor, and, thereby, the volume of particulate matter released from the bin.

For supplying electrical power to the motor, an electrical storage battery may be mounted to the portable structure. In some instances, a battery charger may be adapted to receive power from an external source to recharge the battery. The battery may also be adapted to supply electrical power to the controller.

In some embodiments, an electronic programmable controller is included. The controller is adapted to operate the meter to release a desired volume of particulate matter, in accordance with operator input. This controller is preferably mounted upon the portable structure, but in other embodiments the controller may be a separable unit, with an electrical port provided on the inductor for attaching the remote electronic controller for controllably operating the meter.

In some instances, the controller is adapted to receive an operator input representing a desired weight of matter to be released and to calculate, based upon at least this input and a stored particulate matter density value, a corresponding volume of matter to be released.

When a preset amount of matter has been released, in some cases the controller is adapted to automatically stop releasing the particulate matter, while liquid carrier continues to flow along the conduit. Under such conditions, the controller is preferably adapted to alert an operator when the preset amount of particulate matter has been released.

In some embodiments, the conduit is adapted to apply a sub-atmospheric pressure to the released particulate matter, in the presence of an operative liquid carrier flow, to motivate the released matter into the conduit. This conduit may include an eductor, for example, which effectively forms a venturi. Such an eductor is preferably constructed to dissolve the particulate matter into the carrier liquid within the eductor, or as soon as possible thereafter. Preferably, the conduit is adapted to apply a vacuum of between about 0.5 and 6 pounds per square inch (3.4 and 41 kilo-pascals) below atmospheric pressure to the released particulate matter.

In some embodiments a check valve is disposed between the conduit and the meter. The check valve is adapted to be normally closed and to open when the sub-atmospheric pressure falls below a predetermined threshold, thereby applying the sub-atmospheric pressure to the downstream side of the meter. In some cases, a pressure switch responsive to this sub-atmospheric pressure is included, for enabling operation of the meter only in the presence of a desired amount of vacuum. In such cases, the pressure switch is located between the check valve and the meter.

Preferably, the bin comprises a hopper with sides sloped at an angle of between about 45 and 60 degrees from horizontal. It is also preferred that the hopper have an internal volume of between about 5 and 200 cubic feet (0.14 and 5.7 cubic meters).

In some cases, a vibrator is structurally connected to the bin and adapted to vibrate the bin during operation to assist flow of the particulate matter into the meter.

Preferably the portable structure has a base footprint sufficiently small to fit within a 4 foot by 8 foot (1.2 meter by 2.4 meter) rectangle. For example, one preferred embodiment has a base footprint of about 42 inches by 48 inches (1.0 meter by 1.2 meters).

According to another aspect of the invention, a method of dispensing precise amounts of dry particulate matter directly into a liquid carrier stream is provided. The method includes first connecting the conduit of the device of the invention, the bin of which contains particulate matter, to a source of liquid carrier; and then motivating a flow of the liquid carrier through the conduit, thereby dispensing a desired amount of the particulate matter from the bin of the device into the flow of liquid carrier.

In some cases, the particulate matter comprises an agricultural pesticide, fertilizer or adjuvant.

The liquid carrier may comprise water or a liquid fertilizer, for instance.

In some instances, the flow of liquid carrier is directed from the conduit of the device to a receptacle.

Where the device includes an electronic controller for controlling the meter of the device, the method may further include, prior to the step of motivating, entering a value into the controller representing a desired amount of particulate matter to be released. The method may also include, prior to the step of motivating, entering a value into the controller representing the density of the particulate matter to be released.

According to another aspect of the invention, a method of distributing agricultural chemicals in particulate form, to be mixed with a liquid carrier before use, is provided. The method includes the steps of:

(1) providing multiple devices constructed according to the invention, as described above;

(2) distributing the devices, with corresponding quantities of agricultural chemicals, to individual end users for dispensing the agricultural chemicals into liquid carrier streams at remote locations; and then (3) accepting the devices as returned from the end users, after the end users have dispensed at least some of the distributed chemicals.

In some embodiments, the method also includes, before distributing each device, filling the bin of the device with the corresponding quantity of agricultural chemical; and then, after accepting the returned devices, refilling the bins of the devices with additional agricultural chemicals.

By using an inductor constructed according to the invention, a dry chemical substance can be properly and accurately metered directly into a liquid carrier, without possibly harmful exposure to chemical dust and fumes. Additionally, transportation of pre-mixed liquid chemicals can be avoided, with the chemicals being transported all the way to their use site in dry form. Simple, automated operation at remote sites may be provided by a control system that is adapted to run on on-board batteries, with very little operator input. Other advantages and features will also be understood from the following description of embodiments.

BRIEF DESCRIPTION OF THE DRAWINGS

FIG. 1 is a perspective view of a programmable, dry chemical inductor.

FIG. 2 shows the inductor being transported by truck.

FIGS. 3A and 3B are schematic side views of the inductor, with transparent side panels, to illustrate its internal components and structure.

FIG. 4A is a side view of the metering device, with the end caps of the meter housing transparent to show the internal rotor.

FIG. 4B is a cross-sectional view, taken along line 4B—4B in FIG. 4A, with the drive motor not sectioned.

FIG. 5 is an illustration of the control panel of the inductor.

FIG. 6 is an upper level functional schematic of the controller.

FIG. 7 illustrates a method of distributing agricultural chemicals.

DETAILED DESCRIPTION OF EMBODIMENTS

Referring first to FIG. 1, a dry chemical inductor 10 is in the form of a box structure having side 12 and top 14 surfaces of sheet aluminum covering a steel frame 16. Lifting brackets 18 at the four top corners of the frame are provided with lifting eyes 19 for hoisting the inductor by chain. Recesses 20 between the feet 22 of the frame provide clearance for fork lift tines. The feet are spaced so as to fit just inside of the lifting brackets of a lower inductor, with sufficient clearance for the lid of the lower inductor, for stable stacking. The inductor housing has an overall height "H" of 72 inches (1.83 meters), with a base footprint of about 42 by 48 inches (1.0 by 1.2 meters), the size of a standard shipping pallet, for efficient stacking on a standard flatbed truck. The height "H" of various embodiments will depend in part on the desired internal hopper volume. These dimensions provide for an internal hopper volume of 40 cubic feet (1.1 cubic meters), for example. Given the small size of the inductor, it can readily be loaded onto the bed of a standard pickup truck 24 for transportation, as illustrated in FIG. 2. Other sizes of inductors will accommodate other hopper volumes.

Still referring to FIG. 1, the top 14 of inductor 10 has an opening which is normally covered by a removable lid 26. The opening may be of 22.5 inches (57 centimeters) in diameter, for example, similar to the diameter of a standard drum. Lid 26 is in the form of a cover 28 and rubber gasket 30 held in place by a clamp ring 32 to form a dust-free seal to reduce the chance of operator exposure to airborne chemicals. Generally, such a seal is required by some presently existing safety, environmental and regulatory standards for shipping particulate chemicals.

As discussed further below, and shown in subsequent drawings, inductor 10 has an internal hopper containing a quantity of bulk material which is intended to be mixed with a liquid carrier for use. To dispense a desired quantity of the bulk material into a liquid carrier, the user must first hook up the carrier inlet port 34 to a liquid carrier source, such as a water pump (not shown), that is adapted to motivate a flow of liquid carrier into the inlet port of the inductor. The mixture outlet port 36 is connected to a flexible hose for directing the liquid carrier and entrained bulk material from the inductor to a desired destination, such as a spray tank or mixing tank (also not shown). In the illustrated embodiment, ports 34 and 36 are two-inch (roughly 5 centimeter) cam and groove quick-connect couplings, sized to permit a liquid carrier flow rate of at least about 350 gallons (1350 liters) per minute. A value representing the amount of bulk material to be released (the "setpoint") is keyed into a control panel 38, and a flow of liquid is started through the inductor. When the inductor has sensed the presence of sufficient carrier flow, it automatically meters into the flow the desired amount of bulk material, without letting the liquid carrier flow up into the internal hopper to wet any unreleased bulk material. When the desired amount of bulk material has been released into the flow of carrier liquid, inductor 10 automatically stops dispensing the bulk material and alerts the user that the setpoint has been reached. The user can then turn off the flow of carrier liquid, or let it continue to run through the inductor, such as to complete the filling of a spray tank and further dilute the mixture.

Figure 3B:
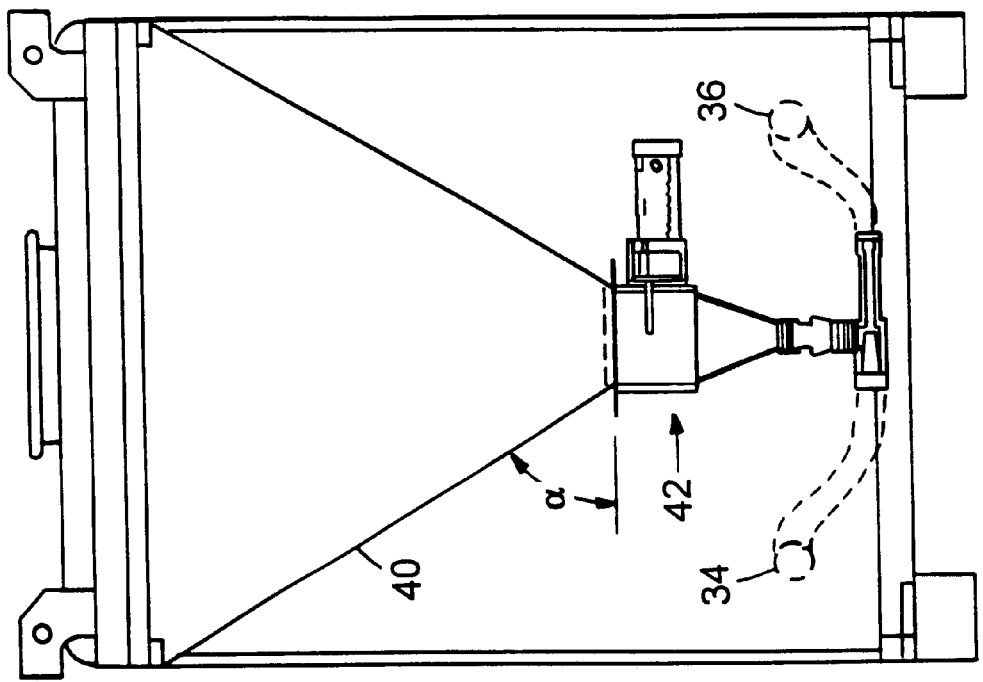
Figure 3A:
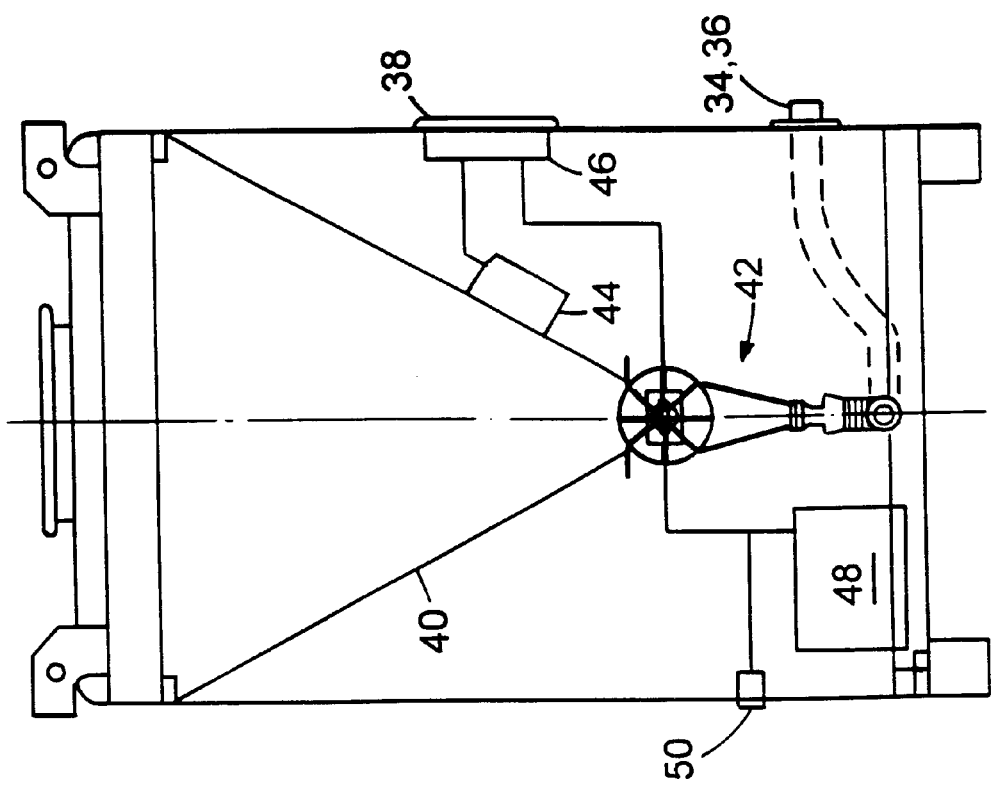

Referring to FIGS. 3A and 3B, a sealed hopper 40 is mounted within the outer structure of inductor 10. Hopper 40 is shaped to promote gravitational feeding of bulk materials into the metering device 42 located at its lower end. We have determined that a wall slope angle "α" of between about 45 and 60 degrees will work for many particle shapes and sizes, 60 degrees being preferable for powders and other very fine particles. To assist with the flow of the bulk material into metering device 42, an electric vibrator 44, such as a model DC-300-24V available from Vibco, may be firmly attached to hopper 40 to vibrate the hopper and induce downward flow. Behind control panel 38 is a programmable electronic controller 46 that controls the operation of inductor 10, including vibrator 44 and metering device 42. Electric power is provided by a pair of 12 VDC, 17 amp-hour rechargeable batteries 48, which provide enough power for about 4 hours of operation between charges with the vibrator running. An electrical charge port 50 is accessible from outside the inductor to recharge batteries 48 and/or power the inductor. Internal conduits hydraulically connect ports 34 and 36 through metering device 42.

FIGS. 4A and 4B better illustrate the structural detail of metering device 42. A ⅛ horsepower, 32 RPM, 24 VDC gearmotor 52, such as model PR990235, available from Leeson, drives the multi-vaned rotor 54 of a bulk material transfer gate 56, such as the airlock described in U.S. Pat. No. 5,803,673. Gate 56 has a rotationally molded polycarbonate housing 58 and end caps 60, and an injection molded "DELRIN" rotor 54 with eight integrally molded vanes 62 that define, in cooperation with housing 58 and end caps 60, eight discrete pockets 64 that transport bulk material from upper opening 66, open to the hopper (40, FIG. 3A) to a conical vacuum chamber 68 defined within housing 58 below the rotor. The rotor is supported on integrally molded axial projections 100 protruding from each end of the rotor through corresponding holes in end caps 60. An aluminum motor shaft receiver 102, of hexagonal outer shape, is insert molded into one of projections 100, and defines a keyed central hole for receiving the motor shaft which drives the rotor. PTFE-encapsulated neoprene O-rings 104 provide for dynamic sealing between rotor 54 and end caps 60 during operation. A running clearance of about 0.005 inch (0.13 millimeter) is provided axially between the rotor and each end cap, and radially between the rotor and housing 58. We have found that this clearance results in acceptably low leakage about the vanes for most intended bulk materials and at operating vacuum pressures. At the highest point of their rotation, vanes 62 of rotor 54 extend above the upper flange 106 of the gate (i.e., into the hopper) a distance "d" of about 1.0 inch (25 millimeters), helping to avoid "bridging" of packable bulk materials just above the gate. In this embodiment, rotor 54 has an overall diameter of about 7 inches (18 centimeters) and a length of about 7 inches (18 centimeters).

All of pockets 64 are of similar volume. In this embodiment, each pocket 64 has a volume of about 25.92 cubic inches (425 cubic centimeters), which is effectively the "resolution" of the dispensing system. Of course, gates 56 defining discrete pockets of other shapes and volumes are considered within the scope of this invention. For example, pocket volumes as low as 3 cubic inches (50 cubic centimeters) provide even finer resolution. Ideally, each pocket is completely and sequentially filled with bulk material from opening 66, and completely empties into vacuum chamber 68. To help ensure complete pocket filling and emptying, motor 52 may be adapted to impart a vibration to gate 56. For embodiments having a separate vibrator (44, FIG. 3A), the gate may be structurally coupled to the vibrator to enhance pocket filling. Rotor positional feedback to the controller is provided by rare earth magnets 69 embedded in the vanes of the rotor, which are sensed by a hall effect sensor 71 in the housing end cap adjacent the motor. Alternatively, motors 52 with built-in positional feedback systems may be employed. As rotor 54 rotates, pulses from hall effect sensor 71 inform the controller of the passage of each vane, and therefore of the emptying of each pocket. The controller monitors these pulses until it has determined that the desired number of pockets of material, as determined from operator input and known pocket volume, have been dispensed. Once the controller stops applying power to motor 52, friction and internal damping generally cause the motor to coast only a few degrees before coming to a stop, providing for an accuracy of +/−1 pocket or better in the total amount released. Better accuracies may be provided by equipping the motor with braking means (not shown) to positively stop rotation of the rotor at a desired vane increment.

The inner side walls of vacuum chamber 68 are sloped at an angle "β" of about 76 degrees above horizontal, to aid in directing released bulk material downward into the inlet of a vacuum check valve 70. We prefer an angle β of at least 70 degrees to overcome the tendency of some materials to adhere to the inner walls of housing 58 which, alternatively, may be of die-cast aluminum with an anodized PTFE inner surface.

Check valve 70 is attached, by air-tight connections, to both gate housing 68 and eductor 72. Valve 70 contains a wafer 74 which is urged against a seat, toward gate 56, by a preload extension spring 76, thereby blocking flow between the gate and eductor. When a predetermined carrier flow rate through eductor 72 has been reached or exceeded, flowing from inlet 78 to outlet 80, a reduction in absolute pressure is achieved below wafer 74. When the vacuum below wafer 74 is sufficient, wafer 74 moves away from its seat and transmits this vacuum to chamber 68. It is preferred that gate 56 not be operated to dispense materials before a vacuum pressure has been established in chamber 68. In other words, it is preferable that a threshold flow rate through eductor 72 be established before motor 52 begins to rotate rotor 54. To that end, a pressure switch 82 is responsive to vacuum pressure within chamber 68 and signals the controller when the pressure in chamber 68 is below a predetermined threshold. The controller does not activate motor 52 until such a signal is received, thus preventing material release until a sufficient flow rate of carrier liquid has opened check valve 70. This also helps to reduce the amount of contamination of bulk material in the hopper if the system were operated with a failed, open check valve. Should the flow of carrier liquid suddenly stop, check valve 70 will automatically and rapidly close, thus preventing any substantial flow of carrier liquid up into chamber 68. At the same time, switch 82 will detect the loss of vacuum and the controller will stop energizing motor 52. Of course, insubstantial amounts of carrier vapor or droplets will occasionally pass through check valve 70 and enter chamber 68, such as when flow through eductor 72 is abruptly stopped. Of this minor amount of leakage, a small amount of vapor may be vented through gate 56 and up into the hopper. Importantly, however, the combination of check valve 70 and gate 56 avoids any significant amount of carrier liquid, any amount of which would cause detrimental contamination, packing or dissolution, to enter the hopper. Commercially available eductors 72 are available as models 2083-X from Mazzei (high flow, low vacuum), and "2-inch ELL" from Penberthy (low flow, high vacuum). For more controlled air flow through vacuum chamber 68, such as to help keep released materials flowing through check valve 70, a vacuum check valve (not shown) may be installed through the side wall of housing 58, below gate 56, to let in a controlled flow of air and regulate vacuum pressure.

Figure 5:
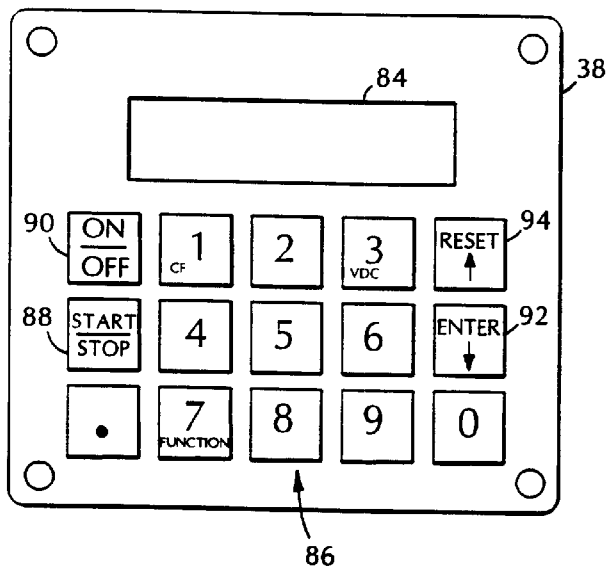

Referring to FIG. 5, control panel 38 has a digital display 84 for displaying textual information, and a keypad 86 for operator input. Besides a typical 10 number keys and a decimal key, keypad 84 includes a "START/STOP" key 88, an "ON/OFF" key 90, an "ENTER" key 92 and a "RESET" key 94. "ON/OFF" key 90 controls system power, as its name implies. After entering a setpoint, the operator pushes the "START/STOP" key 88 to begin automatic release of the material. During operation, pushing the "START/STOP" key 88 pauses the release of material and initiates an audible alarm and appropriate visual display indicating that release has been interrupted. "ENTER" key 92 is used for entering user input, such as data and passwords, and "RESET" key 94 is for acknowledging and resetting alarms or clearing keyed values. In addition, there are four additional functions performed by pushing various keys in combination with key "7", sub-labelled "FUNCTION". Holding key "7" while pushing key "1", for example, displays the calibration factor (CF) for three seconds. This calibration factor represents the density of the bulk material, in pounds per pocket. Holding key "7" while pushing key "3", displays current battery voltage (VDC). Holding key "7" while pushing either the "RESET" or "ENTER" keys will either raise or lower, respectively, the contrast of display 84. If desired, a coaxial controller cable input jack 120 (FIG. 1) may be provided for operation of the inductor from a pendant controller or keypad.

Three password levels are provided for various function authorizations. A typical user will be provided with a first level password which enables the entry of setpoints and very basic system operation. A second level password allows the user to change inventory parameters, calibration factors, or perform self-calibration. For self-calibration, the user will direct the system to dispense a given amount (e.g., weight) of material. The user then weighs the dispensed material with appropriate weighing means (not shown) and enters the weight of the material actually dispensed. The controller then adjusts its calibration factor accordingly. An example of changing inventory parameters is changing a value representing the total amount of bulk material presently contained within the hopper. For example, when filling the inductor with bulk material, a dealer may enter into the controller the total weight of material supplied. During operation, the controller continuously subtracts from this value the weight of material dispensed. When the controller determines that all of the material originally supplied has been dispensed (i.e., when the total weight register reads "0"), any further dispensing of material by the end user is disallowed. This safeguard is particularly important for enabling the dealer to reliably track the overall amount of material dispensed through the inductor, for example. A third level password authorizes more advanced adjustments, such as changing the motor speed, timer values or alarm points.

Figure 6:
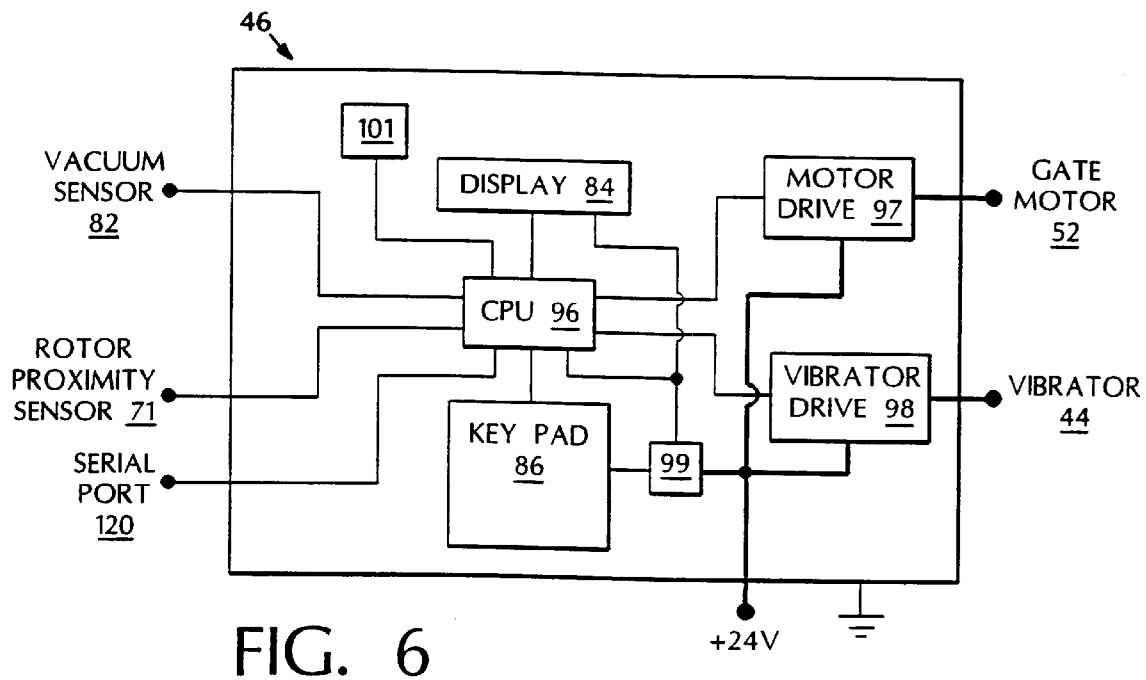

Referring to FIG. 6, a programmable microprocessor 96 is programmed to perform all data manipulations in controller 46. CPU 96 receives input from the vacuum sensor or switch 82 (FIG. 4B), the vane-sensing hall effect sensor 71 (FIG. 4B), keypad 86 and, in some embodiments, a serial port (e.g., port 120 in FIG. 1). Based upon these inputs, CPU 96 drives motor drive circuitry 97 to pulse-width modulate high side power to gate motor 52 (FIG. 4B) to drive the gate rotor and dispense product. At the same time, CPU 96 triggers a power switch 98 to turn on the vibrator, if so equipped. A 5V voltage regulator 99 steps battery voltage down to power the electronic controller components. Display 84 is a two row, 16 character per row, backlit LCD display via which the controller communicates visually with the operator. In addition, a buzzer 101 gives an audible alarm when triggered by the CPU.

Figure 7:
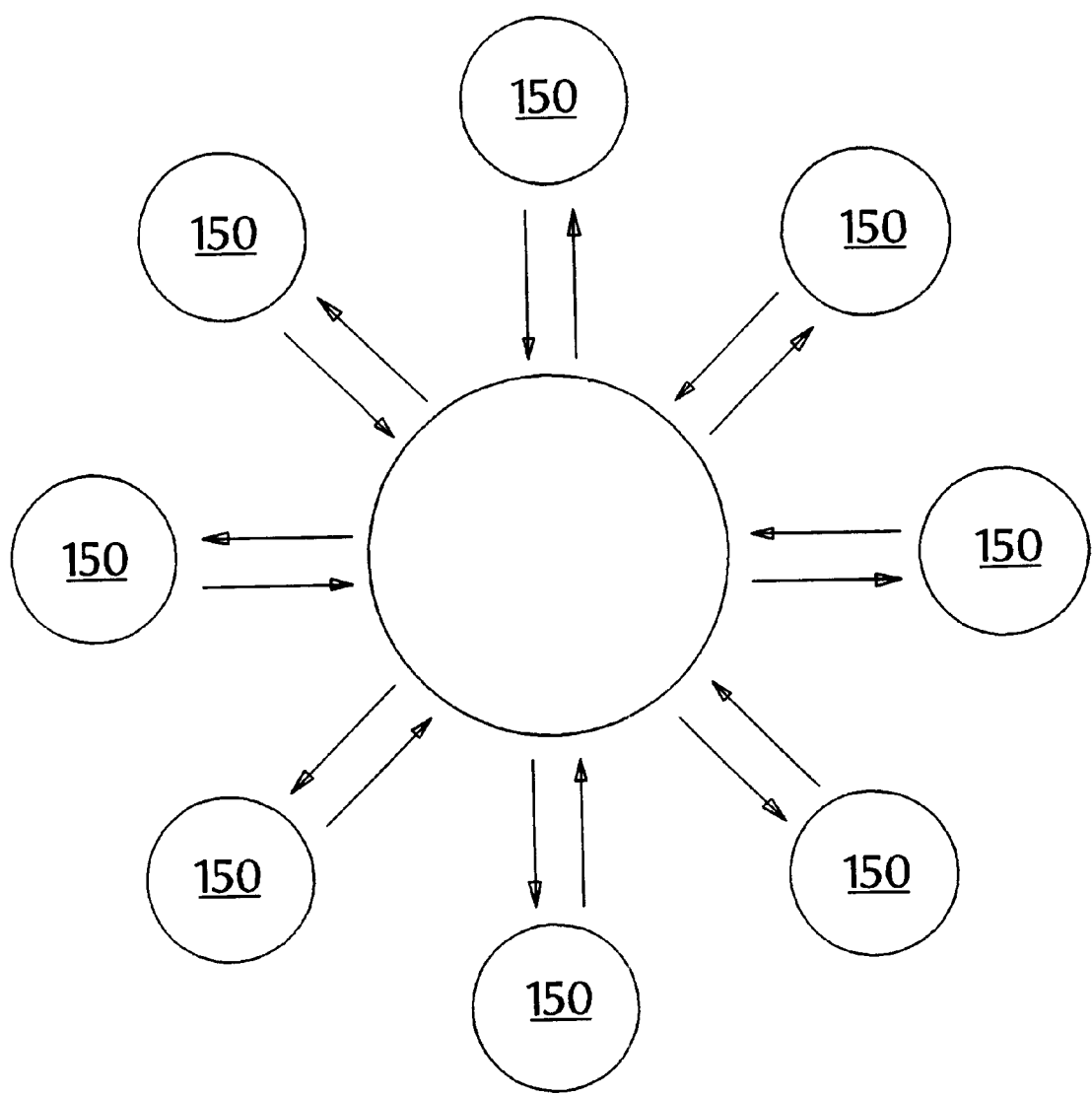

In FIG. 7, a method of distributing agricultural chemicals in particulate form includes distributing devices described herein, with quantities of agricultural chemicals, to individual end users 150 for dispensing the agricultural chemicals into liquid carrier streams at remote locations, and then accepting the devices as returned from the end users, after the end users have dispensed some of the distributed chemicals.

Other embodiments are also within the scope of the invention, although not illustrated in the drawings. For example, much smaller inductors may be produced for home gardening and landscaping applications, which are filled with dry chemicals at garden supply stores and then rented to homeowners or lawn care specialists. Such inductors may be attached to garden hoses for automatically dispensing selected rates of chemical into a monitored flow of water through the inductor. After use, the inductor may be returned to the dealer for cleaning and reuse, without the customer having ever been exposed to dry chemicals or had to either mix or transport liquid chemicals. Furthermore, inductors may be equipped with multiple, separate hoppers and metering devices, which may all feed a common eductor for instance, with a more sophisticated controller programmed to enable the operator to select chemical mix ratios, such as for customized fertilization. Such an inductor may be particularly useful to lawn care specialists, transported to each work site on the back of their equipment truck. Other embodiments will also be found to fall within the scope of the following claims.

What is claimed is:

1. A device for dispensing precise amounts of dry particulate matter directly into a liquid carrier stream, the device comprising:
    a bin for holding a quantity of particulate matter;
    a conduit for transporting a stream of liquid carrier;
    a meter connected to the bin for controllably releasing a desired amount of the particulate matter from the bin into the conduit while disallowing entry of the liquid carrier to the bin, the meter including
        a rotor constrained to rotate within a housing to release particulate matter from the bin into the conduit, and
        an electric drive motor coupled to the rotor for rotation;
    a rotor rotation sensor;
    a controller adapted to automatically stop releasing the particulate matter when a desired amount of particulate matter has been released from the bin, the controller adapted to monitor a signal from the rotation sensor, determine, based upon said signal, when a desired amount of particulate material has been released, and then to stop applying power to the drive motor; and
    a portable structure upon which the bin, conduit and meter are mounted for transportation with particulate matter in the bin.

2. The device of claim 1, wherein the rotor has vanes defining therebetween discrete pockets of known volume.

3. The device of claim 2, wherein the pockets each have a volume of less than about 30 cubic inches (500 cubic centimeters).

4. The device of claim 3, wherein the pockets each have a volume of about 25 cubic inches (400 cubic centimeters).

5. The device of claim 3, wherein the pockets each have a volume of less than about 10 cubic inches (150 cubic centimeters).

6. The device of claim 1 wherein the rotor comprises multiple vanes defining pockets of known volume therebetween, and wherein the rotor rotation sensor is responsive to passage of the vanes.

7. The device of claim 1, wherein the controller is adapted to monitor the number of revolutions of the rotor, and, thereby, the volume of particulate matter released from the bin.

8. The device of claim 7, further comprising an electrical storage battery mounted to the portable structure and adapted to supply electrical power to the motor.

9. The device of claim 8, further comprising a battery charger adapted to receive power from an external source to recharge the battery.

10. The device of claim 8, wherein the battery is further adapted to supply electrical power to the controller.

11. The device of claim 1, wherein the controller is electronic and programmable and adapted to operate the meter to release a desired volume of particulate matter, in accordance with operator input.

12. The device of claim 1, wherein the controller is mounted upon the portable structure.

13. The device of claim 1, wherein the controller is adapted to receive an operator input representing a desired weight of matter to be released and, based upon at least this input and a stored particulate matter density value, calculate a corresponding volume of matter to be released.

14. The device of claim 1, wherein the rotor has vanes defining therebetween discrete pockets of known volume, and wherein the controller is adapted to calculate a number of pockets of particulate matter to be released, and to rotate the rotor accordingly.

15. The device of claim 1, wherein the controller is adapted to automatically stop releasing the particulate matter while liquid carrier continues to flow along the conduit.

16. The device of claim 15, wherein the controller is adapted to alert an operator when the preset amount of particulate matter has been released.

17. The device of claim 1, wherein the conduit is adapted to apply a sub-atmospheric pressure to the released particulate matter, in the presence of an operative liquid carrier flow, to motivate the released matter into the conduit.

18. The device of claim 17, wherein the conduit comprises an eductor which effectively forms a venturi.

19. The device of claim 18, wherein the eductor is constructed to dissolve the particulate matter into the carrier liquid within the eductor.

20. The device of claim 17, wherein the conduit is adapted to apply a vacuum of between about 0.5 and 6 pounds per square inch (3.4 and 41 kilo-pascals) below atmospheric pressure to the released particulate matter.

21. The device of claim 17, further comprising a check valve disposed between the conduit and the meter, the check valve adapted to be normally closed and to open when the sub-atmospheric pressure falls below a predetermined threshold, thereby applying the sub-atmospheric pressure to a downstream side of the meter.

22. The device of claim 21, further comprising a pressure switch responsive to said sub-atmospheric pressure, for enabling operation of the meter only in the presence of a desired amount of vacuum, the pressure switch disposed between the check valve and the meter.

23. The device of claim 1, comprising an electrical port for attaching a remote electronic controller for controllably operating the meter.

24. The device of claim 1, wherein the bin comprises a hopper with sides sloped at an angle of between about 45 and 60 degrees from horizontal.

25. The device of claim 24 wherein the hopper has an internal volume of between about 5 and 200 cubic feet (0.14 and 5.7 cubic meters).

26. The device of claim 1, further comprising a vibrator structurally connected to the bin and adapted to vibrate the bin during operation to assist flow of the particulate matter into the meter.

27. The device of claim 1, wherein the portable structure has a base footprint sufficiently small to fit within a 4 foot by 8 foot (1.2 meter by 2.4 meter) rectangle.

28. The device of claim 6 wherein the rotation sensor comprises a hall effect sensor.

29. The device of claim 15, wherein the controller is adapted to alert an operator when the preset amount of particulate matter has been released.

30. A device for dispensing precise amounts of dry particulate matter directly into a liquid carrier stream, the device comprising:

a bin for holding a quantity of particulate matter;

a conduit for transporting a stream of liquid carrier;

a meter connected to the bin for controllably releasing a desired amount of the particulate matter from the bin into the conduit while disallowing entry of the liquid carrier to the bin; and a portable structure upon which the bin, conduit and meter are mounted for transportation with particulate matter in the bin;

wherein the conduit is adapted to apply a sub-atmospheric pressure to the released particulate matter, in the presence of an operative liquid carrier flow, to motivate the released matter into the conduit;

the device further comprising a check valve disposed between the conduit and the meter, the check valve adapted to be normally closed and to open when the sub-atmospheric pressure falls below a predetermined threshold, thereby applying the sub-atmospheric pressure to a downstream side of the meter; and a pressure switch responsive to said sub-atmospheric pressure, for enabling operation of the meter only in the presence of a desired amount of vacuum, the pressure switch disposed between the check valve and the meter.

31. The device of claim 30 further comprising a pressure switch responsive to said sub-atmospheric pressure, for enabling operation of the meter only in the presence of a desired amount of vacuum, the pressure switch disposed between the check valve and the meter.

32. The device of claim 30, wherein the meter includes a rotor with vanes defining therebetween discrete pockets of known volume.

33. The device of claim 32, wherein the pockets each have a volume of less than about 30 cubic inches (500 cubic centimeters).

34. The device of claim 30, further comprising a controller adapted to monitor number of revolutions of the rotor, and, thereby, the volume of particulate matter released from the bin.

35. The device of claim 30, further comprising a controller adapted to receive an operator input representing a desired weight of matter to be released and, based upon at least this input and a stored particulate matter density value, calculate a corresponding volume of matter to be released.

36. The device of claim 35, wherein the controller is adapted to automatically stop releasing the particulate matter while liquid carrier continues to flow along the conduit.

37. The device of claim 36, wherein the controller is adapted to alert an operator when the preset amount of particulate matter has been released.

38. A method of distributing agricultural chemicals in particulate form, to be mixed with a liquid carrier before use, the method comprising the steps of:
  providing multiple devices each comprising:
    a bin for holding a quantity of particulate matter;
    a conduit for transporting a stream of liquid carrier;
    a meter connected to the bin for controllably releasing a desired amount of the particulate matter from the bin into the conduit while disallowing entry of the liquid carrier to the bin, the meter including
      a rotor constrained to rotate within a housing to release particulate matter from the bin into the conduit, and
      an electric drive motor coupled to the rotor for rotation;
    a rotor rotation sensor;
    a controller adapted to automatically stop releasing the particulate matter when a desired amount of particulate matter has been released from the bin, the controller adapted to monitor a signal from the rotation sensor, determine, based upon said signal, when a desired amount of particulate material has been released, and then to stop applying power to the drive motor; and
    a portable structure upon which the bin, conduit and meter are mounted for transportation with particulate matter in the bin;
  distributing at least one of the devices, with quantities of agricultural chemicals, to individual end users for dispensing the agricultural chemicals into liquid carrier streams at remote locations; and then
  accepting the devices as returned from the end users, after the end users have dispensed some of the distributed chemicals.

39. The method of claim 38, further comprising, before distributing each device, filling the bin of the device with a corresponding quantity of agricultural chemical; and then, after accepting the returned devices, refilling the bins of the devices with agricultural chemicals.

40. A device for dispensing precise amounts of dry particulate matter directly into a liquid carrier stream, the device comprising:
  a bin for holding a quantity of particulate matter;
  a conduit for transporting a stream of liquid carrier;
  a meter connected to the bin for controllably releasing a desired amount of the particulate matter from the bin into the conduit while disallowing entry of the liquid carrier to the bin;
  an electronic programmable controller adapted to operate the meter to release a desired volume of particulate matter, in accordance with operator input, wherein the controller is adapted to receive an operator input representing a desired weight of matter to be released and, based upon at least this input and a stored particulate matter density value, calculate a corresponding volume of matter to be released; and
  a portable structure upon which the bin, conduit and meter are mounted for transportation with particulate matter in the bin.

41. The device of claim 40, wherein the meter comprises a multi-vaned rotor constrained to rotate within a housing, the rotor vanes defining therebetween discrete pockets of known volume, and wherein the controller is adapted to calculate a number of pockets of particulate matter to be released, and to rotate the rotor accordingly.

42. The device of claim 40, wherein the controller is adapted to automatically stop releasing the particulate matter when a preset amount of matter has been released, while liquid carrier continues to flow along the conduit.

43. The device of claim 40, wherein the conduit is adapted to apply a sub-atmospheric pressure to the released particulate matter, in the presence of an operative liquid carrier flow, to motivate the released matter into the conduit.

44. The device of claim 43, wherein the conduit comprises an eductor which effectively forms a venturi.

45. The device of claim 43, further comprising a check valve disposed between the conduit and the meter, the check valve adapted to be normally closed and to open when the sub-atmospheric pressure falls below a predetermined threshold, thereby applying the sub-atmospheric pressure to a downstream side of the meter.

46. The device of claim 45, further comprising a pressure switch responsive to said sub-atmospheric pressure, for enabling operation of the meter only in the presence of a desired amount of vacuum, the pressure switch disposed between the check valve and the meter.

47. The device of claim 40, wherein the controller is adapted to automatically stop releasing the particulate matter while liquid carrier continues to flow along Conduit.

48. The device of claim 47, wherein the controller is adapted to alert an operator when the preset amount of particulate matter has been released.

49. A method of dispensing precise amounts of dry particulate matter directly into a liquid carrier stream, comprising the steps of:
  providing a device comprising:
    a bin for holding a quantity of particulate matter;
    a conduit for transporting a stream of liquid carrier;
    a meter connected to the bin for controllably releasing a desired amount of the particulate matter from the bin into the conduit while disallowing entry of the liquid carrier to the bin;
    an electronic controller for controlling the meter of the device; and
    a portable structure upon which the bin, conduit and meter are mounted for transportation with particulate matter in the bin;
  connecting the conduit of the device, the bin of which contains particulate matter, to a source of liquid carrier;
  entering a value into the controller representing the density of the particulate matter to be released;
  entering a value into the controller representing a desired amount of particulate matter to be released; and then
  motivating a flow of the liquid carrier through the conduit, thereby dispensing a desired amount of the particulate matter from the bin of the device into the flow of liquid carrier.

50. The method of claim 49, wherein the particulate matter comprises an agricultural pesticide, fertilizer or adjuvant.

51. The method of claim 49, wherein the liquid carrier comprises water.

52. The method of claim 49, wherein the liquid carrier comprises a liquid fertilizer.

* * * * *